(12) United States Patent
Wu et al.

(10) Patent No.: US 7,483,482 B2
(45) Date of Patent: Jan. 27, 2009

(54) SOFT-THRESHOLD-BASED MULTI-LAYER DECISION FEEDBACK EQUALIZER AND DECISION METHOD

(75) Inventors: An Yeu Wu, Taipei (TW); Chih Hsiu Lin, Yilan County (TW)

(73) Assignee: National Taiwan University, Taipei (TW)

( * ) Notice: Subject to any disclaimer, the term of this patent is extended or adjusted under 35 U.S.C. 154(b) by 678 days.

(21) Appl. No.: 11/172,855

(22) Filed: Jul. 5, 2005

(65) Prior Publication Data
US 2006/0227858 A1 Oct. 12, 2006

(30) Foreign Application Priority Data
Apr. 12, 2005 (TW) .............................. 94111466 A

(51) Int. Cl.
*H03H 7/30* (2006.01)
(52) U.S. Cl. .................................................... 375/233
(58) Field of Classification Search ......... 375/229–236; 333/18, 28 R; 708/300, 322, 323; 379/340, 379/398
See application file for complete search history.

(56) References Cited

U.S. PATENT DOCUMENTS

| 7,130,344 B2 * | 10/2006 | Xia et al. ..................... 375/233 |
| 7,130,366 B2 * | 10/2006 | Phanse et al. ............... 375/350 |
| 7,317,755 B2 * | 1/2008 | Yang et al. ................... 375/229 |
| 2004/0001538 A1 * | 1/2004 | Garrett ........................ 375/229 |
| 2005/0025229 A1 * | 2/2005 | Jones et al. .................. 375/232 |
| 2005/0157820 A1 * | 7/2005 | Wongwirawat et al. ..... 375/326 |

* cited by examiner

*Primary Examiner*—Sam K Ahn
(74) *Attorney, Agent, or Firm*—Bacon & Thomas, PLLC

(57) ABSTRACT

The present invention provides a soft-threshold-based multi-layer decision feedback equalizer, including a feed forward filter for receiving a transmitted data, a feed backward filter, an adder and a soft-threshold-based multi-layer decision engine (STM engine). The adder is coupled to an output end of the feed forward filter and an output end of the feed backward filter, and generating an output of the equalizer. The STM engine includes a threshold detector, a data detector and a state machine. The STM engine detects whether or not the output of the equalizer is in a defined threshold value so as to determine the STM works as a slicer or delay decision.

15 Claims, 8 Drawing Sheets

SOFT-THRESHOLD-BASED MULTI-LAYER DECISION FEEDBACK EQUALIZER AND DECISION METHOD

BACKGROUND OF THE INVENTION

1. Field of the Invention

The present invention relates to a decision feedback equalizer of communication systems. More specifically, the present invention relates to a soft-threshold-based multi-layer decision feedback equalizer and decision method of a receiver of a communication system, such as CD driver, hard disk driver and ether network.

2. Description of the Related Art

In communication systems, the transmitted signal will be dispersed by the channel to interfere the neighboring signals. This impairment is called Inter-Symbol Interference (ISI).

To solve the problem, a Decision Feedback Equalizer (DFE) is employed. The block diagram of the conventional decision feedback equalizer is as shown in FIG. 1. The conventional feedback equalizer includes a feed forward filter 11, a feed backward filter 12, an adder 13 and a decision device 14. $r_n$ is the output of the equalizer and can be expressed as $$r_n = \sum_{m=0}^{N_b-1} b_m \times y_{n-m} - \sum_{m=1}^{N_a} a_m \times \hat{x}_{n-m},$$

where $a_m$ denotes the m-th tap-weight of the feed backward filter, $b_k$ denotes the (k+1)-th tap-weight of the feed forward filter, $N_a$ is the number of taps in the feed backward filter, $N_b$ is the number of taps in the feed forward filter.

In the conventional decision feedback equalizer, the decision device is a slicer. The slicer maps the transmitted signal into the closest output of the decision feedback equalizer. Take 2-PAM {+1, −1} for example, when the output of the decision feedback equalizer is larger than zero, the slicer outputs 1; otherwise, it outputs −1. However, the slicer can be exactly operated only the conventional decision feedback equalizer is in the circumstance with higher SNR (Signal-to-Noise Ratio). If the SNR is not high enough, the slicer would make the decision device to make a decision error. And, this error will be feed back to the feed backward filter to cause error propagation. The performance of the system is reduced.

To solve this problem, F. Zahao, G. Mathew and B. Farhang-Boroujeny disclose a decision feedback equalizer (TT-DEF) in an academic essay, entitled "Techniques for Minimizing Error Propagation in Decision Feedback Detectors for Recording channels" in IEEE *Trans. Mag.*, Vol. 37, Issue: 1, pp. 592-602, published on January 2001. For the TT-DEF, when decision error arises at time n, it will cause a large offset at next time, n+1. By detecting the large offset, the error event at time n can be detected and recovered. The TT-DFE operates as the following equation:

$$r_n = f_0 x_n + \epsilon_n^d,$$

$$\text{Type 1:} r_{n+1} = (f_0 - 2a_1)x_{n+1} + \epsilon_{n+1}^d, \text{ for } x_{n+1} = x_n,$$

$$\text{Type 2:} r_{n+1} = (f_0 + 2a_1)x_{n+1} + \epsilon_{n+1}^d, \text{ for } x_{n+1} = -x_n,$$

where $f_0$ is one tap-weight of the feed forward equalizer. It approximates to 1; $\epsilon_n^d$ is the noise.

As shown in FIG. 2, the TT-DFE employs a threshold test to detect two types of decision error at time n, based on $r_n$, $r_{n+1}$, $x_n$ and $X_{n+1}$ values, which is expressed as:

$$\text{Type 1:} \begin{cases} |r_n| < \alpha_1, \\ |r_{n+1}| > \beta_1, \\ \tilde{x}_{n+1} \neq \hat{x}_n, \end{cases}$$

or $$\text{Type 2:} \begin{cases} |r_n| < \alpha_2, \\ |r_{n+1}| < \beta_2, \\ \tilde{x}_{n+} = \hat{x}_n. \end{cases}$$

where $\alpha_1, \alpha_2, \beta_1$ and $\beta_2$ are design parameters.

SUMMARY OF THE INVENTION

To efficiently suppress the Inter-Symbol Interference of the communication system, the present invention provides a soft-threshold-based multi-layer decision feedback equalizer (STM-FED) to improve the performance of the system.

One objective of the present invention is to provide a soft-threshold-based multi-layer decision equalizer and decision method to suppress the Inter-Symbol Interference of the communication system.

Another objective of the present invention is to provide a STM engine (Soft-Threshold-based Multi-layer engine) with the capability of correcting error. The STM engine is easily implemented by hardware in the conventional decision feedback equalizer and also can easily replace the slicer to implement the decision device.

Yet another objective of the present invention is to provide a soft-threshold-based multi-layer decision feedback equalizer implemented by a low cost VLSI (Very large-Scale Integration) integrated circuit.

To attain the above objectives, the present soft-threshold-based multi-layer decision feedback equalizer includes a feed forward filter, a feed backward filter, an adder and a decision device. The adder is coupled to an output end of the feed forward filter and an output end of the feed backward filter, and generating an output. The decision device detects whether or not the output is in a threshold value so as to determine the decision device works as a slicer or delay decision.

The present soft-threshold-based multi-layer decision feedback equalizer includes a feed forward filter for receiving a transmitted data, a feed backward filter, an adder and a soft-threshold-based multi-layer decision engine (briefly called STM engine). The adder is coupled to an output end of the feed forward filter and an output end of the feed backward filter, and generating an output of the equalizer. The STM engine includes: a threshold detector for detecting the output of the equalizer and generating an output; a data detector for detecting the output of the equalizer and generating a feedback output; and a state machine for controlling the data detector to generate or delay the feedback output in accordance with the output.

In which the threshold detector detects the output of the equalizer based on a defined threshold value, and the output indicates the output of the equalizer is in a reliable region or in an unreliable region.

The state machine includes a slicing state and a delay decision state. When the output indicates the output of the equalizer is in a reliable region, the data detector outputs data and the state machine switches to the slicing state so that the STM engine works as the slicer. When the output indicates the output of the equalizer is in the unreliable region, the state machine is in the delay decision state so that the data detector delays the feedback output until the output indicates the output of the equalizer is in the reliable region, and the state machine returns to the slicing state.

The present soft-threshold-based multi-layer decision method is implemented in a decision device of a decision feedback equalizer. The method includes detecting an output of the decision feedback equalizer based on a threshold value to determine the decision device works as a slicer or delay decision.

The method further comprises the step of using a threshold detector to detect the output of the decision feedback equalizer is in a reliable region or in an unreliable region based on a threshold value.

The method further comprises the step of when the output of the decision feedback equalizer is in the reliable region, the data detector outputs the detected data and the decision feedback equalizer returns to the slicing state.

The method further comprises the step of when the output of the decision feedback equalizer is in the unreliable region, the decision device delays decision and keeps the output of the decision feedback equalizer. The kept output and the output of the decision feedback equalizer at next time are inputted in the threshold detector until the output of the decision feedback equalizer is in the reliable region, then the decision feedback data is output and the decision device works as the slicer.

The soft-threshold-based multi-layer decision feedback equalizer implemented by the soft-threshold-based multi-layer decision method can be applied to a receiver of the communication system, such as the common used receiver of CD driver, hard disk driver and ether network. The hardware cost of the present invention is close to that of the conventional decision feedback equalizer. In design, the present invention simply replaces the conventional slicer with the soft-threshold-based multi-layer engine. The present invention not only efficiently reduces the error propagation caused by the slicer but also efficiently reduces the error rate of receiving signals and the error rate of a series of continuous errors. The error rate of the present invention is superior to that of the conventional decision feedback equalizer.

DETAILED DESCRIPTION OF THE PREFERRED EMBODIMENTS

Figure 1:
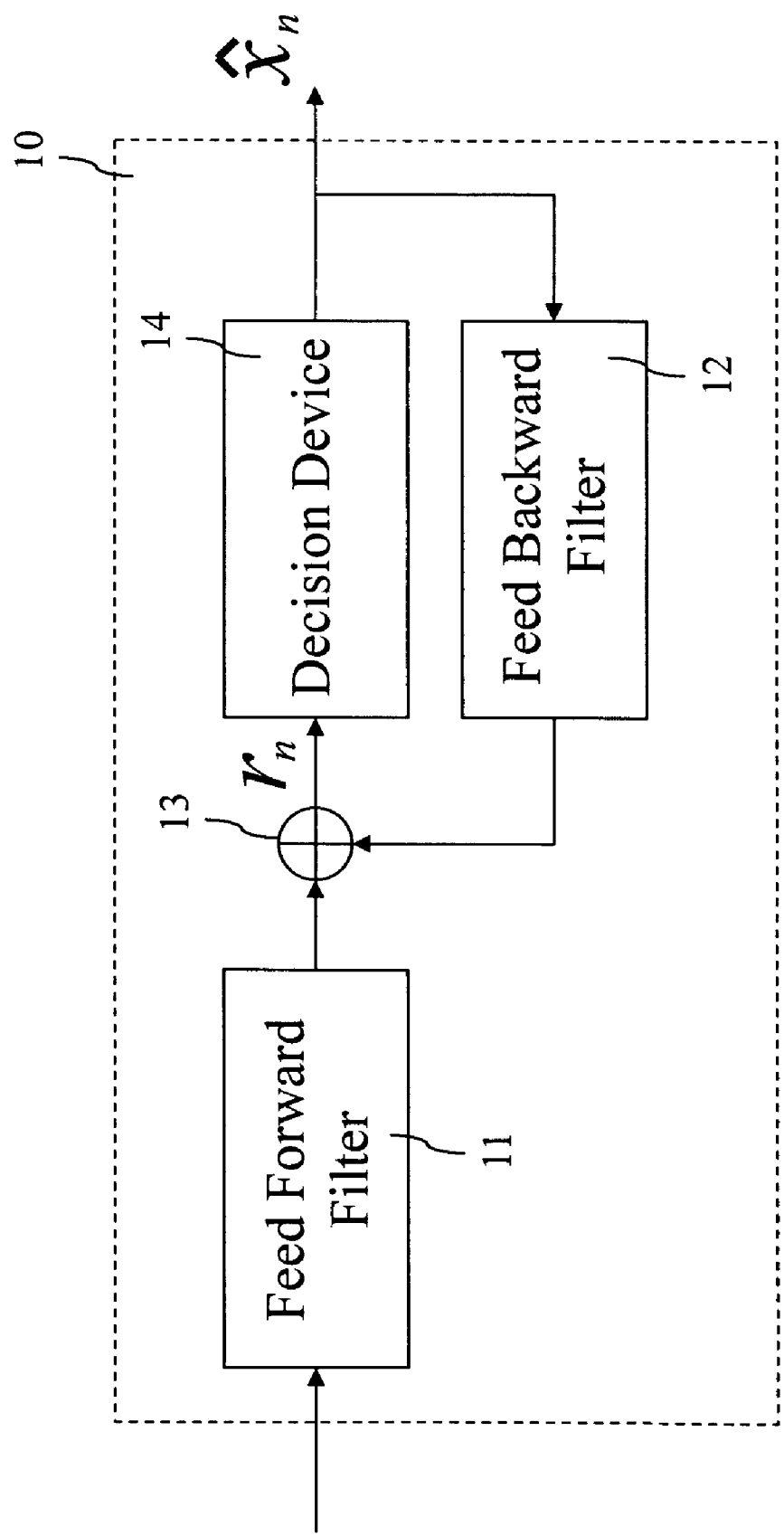
FIG. 1 depicts a block diagram of the conventional decision feedback equalizer.
Figure 2:
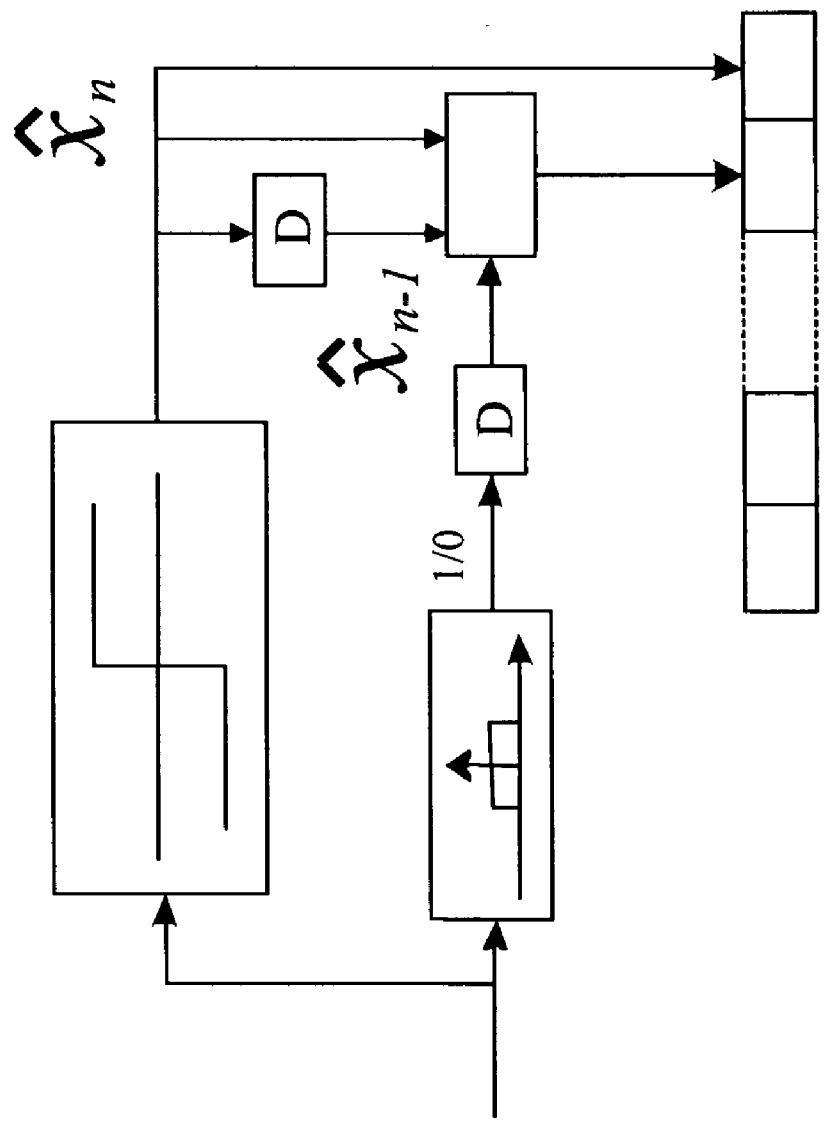
FIG. 2 depicts a block diagram of threshold test of another conventional decision feedback equalizer.

The present invention has been fully described by referring to the accompanying drawings containing the preferred embodiments according to the present invention. However, before the description, those skilled in the art can modify the invention described in the context and obtain the effect of the present invention. Thus, it should be understood that the description set forth herein is a general disclosure to those skilled in the art, and these contents should not be construed as limitation to the present invention.

The present invention provides a soft-threshold-based multi-layer decision method implemented in a decision device of a decision feedback equalizer (DFE). The present method includes the step of detecting the output of the decision feedback equalizer based on a defined threshold value to determine the decision device works as a slicer or delay decision. The threshold value corresponds to the maximum capability of correcting error obtained by using the slicer. The threshold value can be theoretically derived. The decision device divides a reliable region and an unreliable region by threshold detection. The boundary between the reliable region and unreliable region is called the threshold value. The decision device can detect the output is in the reliable region or in the unreliable region so as to determine the operation mode of the decision device.

The operation mode of the decision device includes a slicing mode and a delay decision mode. When the decision device is in the slicing mode, it works as a slicer. When the decision device is in the delay decision mode, it works as delaying the output until it detects the output is in the reliable region, i.e. the received signal is in the threshold value.

According to the soft-threshold-based multi-layer decision method of the present invention, the decision device does not detect the transmitted signal until detecting the received signal is in the reliable threshold value. Take 4-PAM for example, please refer to FIG. 3, there are three unreliable regions defined in Stage 1. When the output $r_n$ of the DFE is in these regions, the decision device does not make decision; otherwise, the decision device detects the transmitted signal. If $r_n$ is in the unreliable region, at time n+1, the equation (1) is defined as flows:

$$\bar{r}_{n+1} = x_{n+1} + a_1 x_n. \tag{1}$$

If the unreliable region is between state 1 and state 2, $x_n$ must be chosen as state 1 and state 2. $x_{n+1}$ can be one value of 4-PAM. Therefore, there are 8 combinations at time n+1. The procedure can be continuous until detecting the output $r_n$ is in the reliable region. The procedure at time n and n+1, ..., n+k, is denoted by Stage 1, 2, ..., and k+1, respectively. The number of states is always 8 in all stages, except for Stage 1. The threshold value in each stage is chosen to maximize the number of corrected error. In each stage, the threshold value may be different. In a preferred embodiment, the present invention provides the optimal threshold value in Stage 1 for 2-PAM modulation. For low cost VLSI implementation, the present invention can limit the number of the maximum stage.

For detection of the present soft-threshold-based multi-layer decision (STM) method, the N-layer STM method means the maximum number of stage is N. In Stage N, the equation (2) is defined as follows:

$$\bar{r}_{n+N-1} = x_{n+N-1} + a_1 x_{n+N-2} + a_2 x_{n+N-3} + \ldots + a_{N-1} x_n \tag{2}$$

The detection at Stage k is to choose $x_{n+N-1}, x_{n+N-2}, \ldots, x_n$, which minimize the equation (3)

$$\sum_{i=1}^{N}\left(\bar{r}_{n+N-i} - \sum_{j=0}^{N-i} a_j x_{n+N-i-j}\right)^2 \quad (3)$$

where $a_0=1$. It must be emphasized that the number of combinations in Eq. (2) is $2M$ except for Stage 1 (in the case of M-PAM), not $M^N$. Moreover, Eq. (3) can be recursively computed, and only $$\sum_{i=1}^{N}\left(\bar{r}_{n+N-i} - \sum_{j=0}^{N-i} a_j x_{n+N-i-j}\right)^2$$

needs to be calculated in Stage N. Other parts can be calculated in Stages 1, 2, ..., and N−1.

Figure 3:
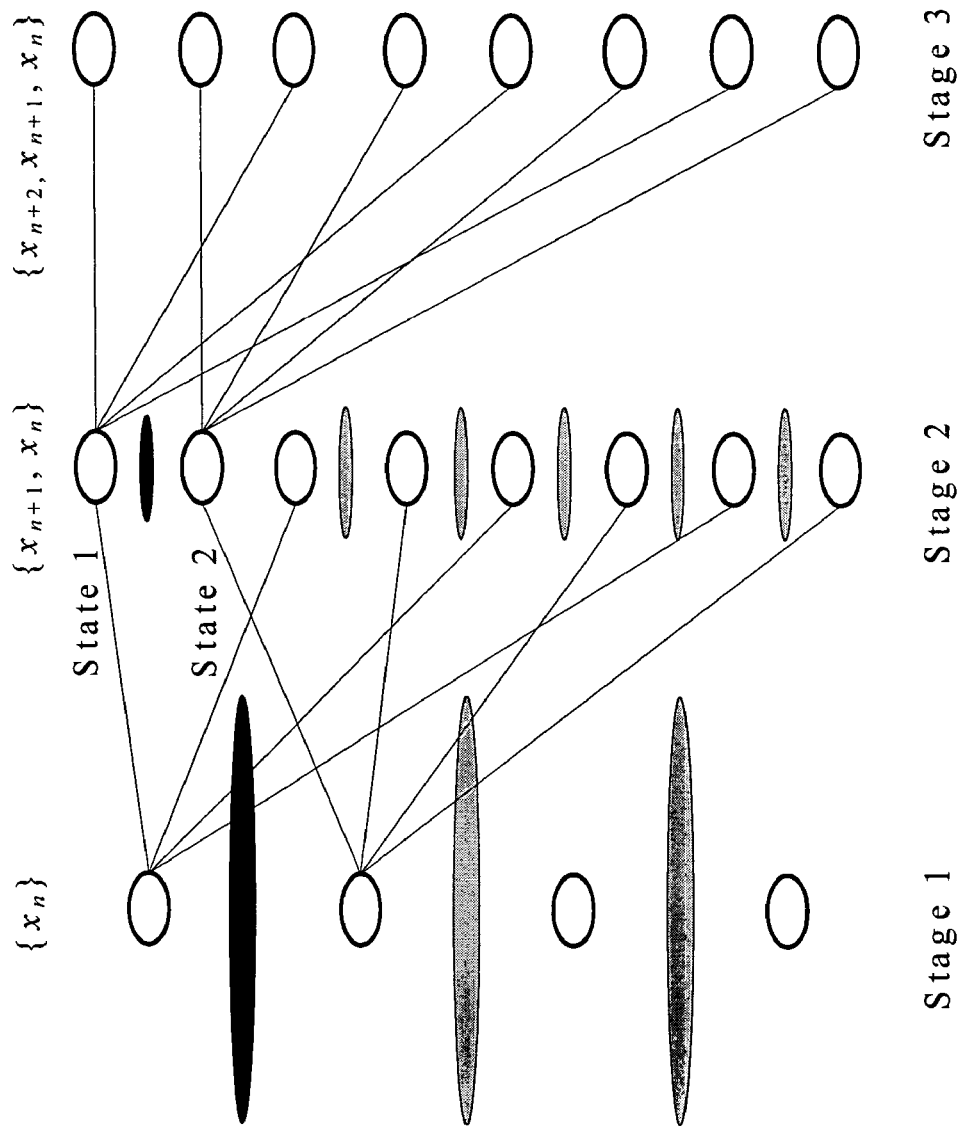
FIG. 3 depicts the concept of the STM decision method of the present invention.

Take 4-PAM $\{+3, +1, -1, -3\}$ for example, please refer to FIG. 3, when the output is in the unreliable region between State 1 $\{+3\}$ and State 2 $\{+1\}$ at time n, the present STM method stores the values of State 1 and State 2 by computing Eq. (3), i.e. $(r_n-3)^2$ and $(r_n-1)^2$. At time n+1, $x_n$ must be +3 or +1, and $x_{n-1}$ can be anyone of 4 states so that there are 8 combinations to be computed. At Stage 2, if the decision is also unreliable, for example, between State 1 ($\{x_{n+1}, x_n\}=\{+3, +3\}$) and State 2 ($\{x_{n+1}, x_n\}=\{+3, +1\}$), the present STM method stores the value $(\bar{r}_n-3)^2+(\bar{r}_n-3-3a_1)^2$ and $(\bar{r}_n-1)^2+(\bar{r}_n-3-a_1)^2$. At time n+2, the only candidates of $\{x_{n+1}, x_n\}$ are $\{+3, +3\}$ and $\{+3, +1\}$, and $x_{n+2}$ can also be chosen from one of 4 states. Also, there are 8 combinations at Stage 3. This procedure can be continuous until the decision becomes reliable. At stage N, if the detection is reliable, the STM method detects k unknown symbols simultaneously and the stage goes into Stage 1.

Figure 4:
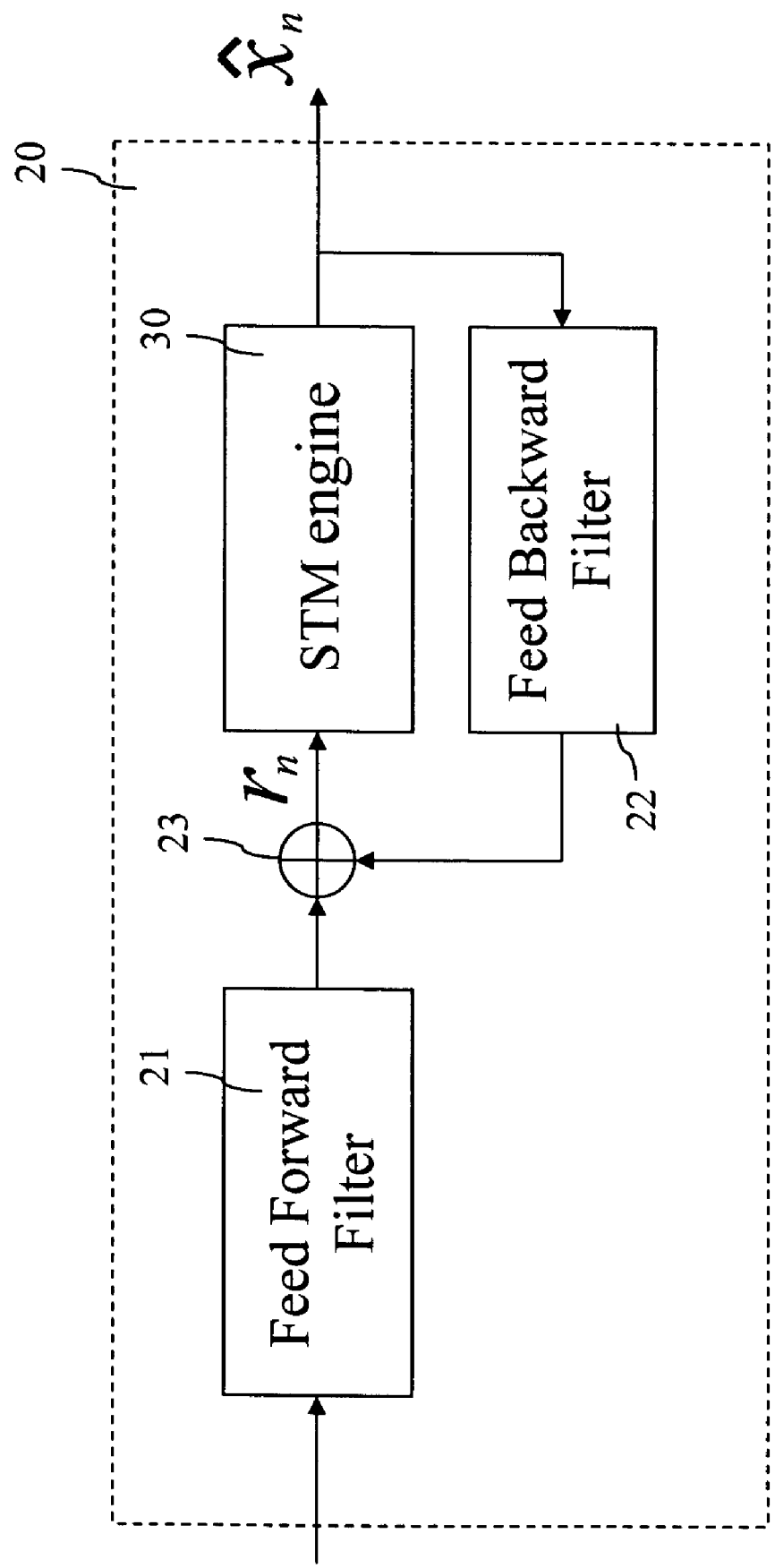
FIG. 4 depicts a block diagram of the STM-DFE of the present invention.

Please refer to FIG. 4, which shows a block diagram of the present soft-threshold-based multi-layer decision feedback equalizer 20. The soft-threshold-based multi-layer feedback equalizer 20 includes a feed forward filter 21 for receiving a transmitted data, a feed backward filter 22, an adder 23 and a soft-threshold-based multi-layer decision engine (briefly called STM engine) 30. The adder 23 is coupled to an output end of the feed forward filter 21 and an output end of the feed backward filter 22, and generating an output of the equalizer 20. The STM engine 30 includes a threshold detector 31, a data detector 32 and a state machine 33.

Figure 5:
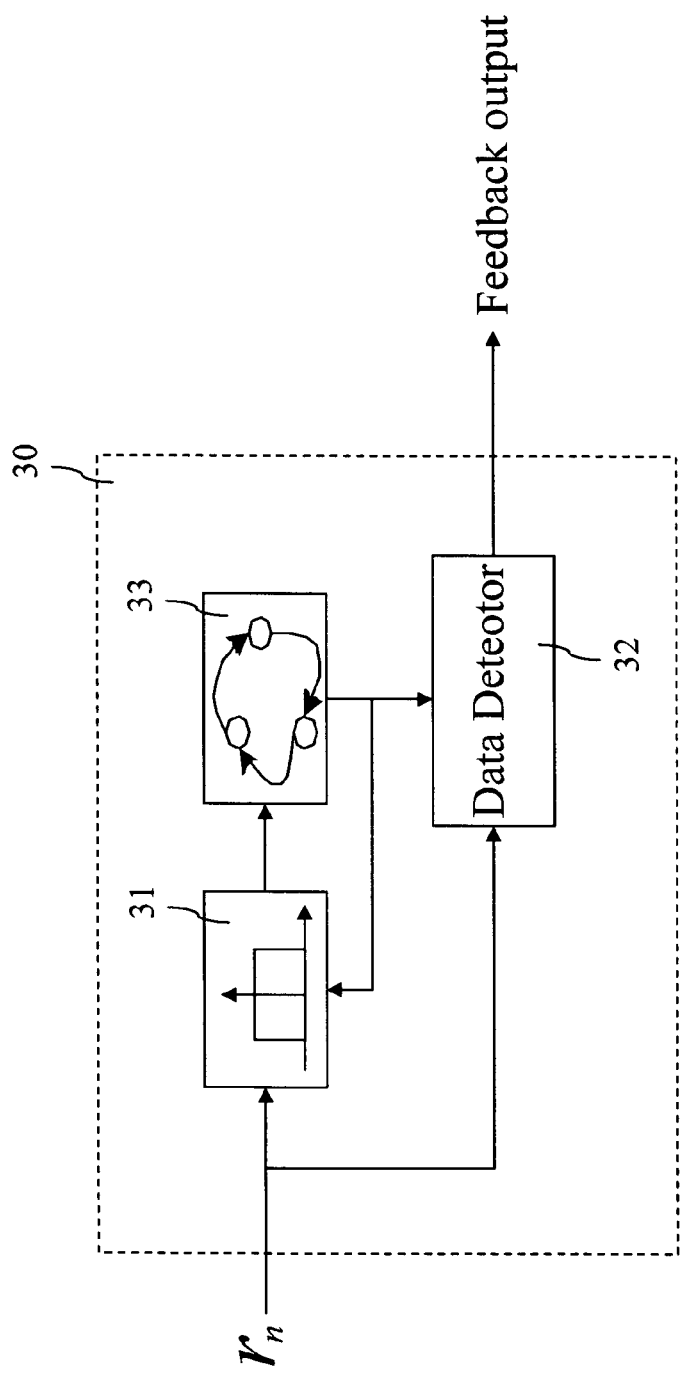
FIG. 5 is a block diagram of the STM engine of the present invention.

For the operation of the STM engine 30, please refer to FIG. 5, the state machine 33 is a finite state machine. When the state is k, i.e., Stage k+1, if the threshold detector 31 outputs an unreliable signal, then the state is increased by 1 (entering the next Stage). That is, the STM engine 30 delays the decision output. Otherwise, the state is set to 0, i.e., in Stage 1. The threshold detector 31 tests whether or not the output of the equalizer 20 is reliable in the current Stage, and outputs the result to the state machine 30. The threshold value is designed parameters. The optimal threshold value can be approximated to $|a_1|\times|1-a_1|$ in Stage 1. The data detector 32 detects the transmitted data according to Eq. (3).

In the preferred embodiment, the present invention provides one design example for magnetic recording systems. In the magnetic recording system, the modulation scheme is 2-PAM. Therefore, the present invention employs 2-layer STM algorithm to implement STM-DFE. See FIG. 6A, each block of the STM engine 30 is described as follows:

1. Threshold detector 31: Test if the input is smaller than $|a_1|\times|1-a_1|$, then output a binary value to control the finite state machine. In the preferred embodiment, the threshold value of Stage 1 is $|a_1|\times|1-a_1|$, $a_1$ is the first weight coefficient of the feed backward filter.

2. State machine 33: It has two states. These two states are slicing mode and delay decision mode. In the slicing mode, the STM engine is in Stage 1. If $|r_n|$ is larger than $|a_1|\times|1-a_1|$, the STM engine works as a slicer. Otherwise, the decision is delayed and the STM engine keeps $r_n$. The operation mode changes into the delay decision mode. In the delay decision mode, the STM engine detects two transmitted data and changes into the slicing mode.

Figure 6B:
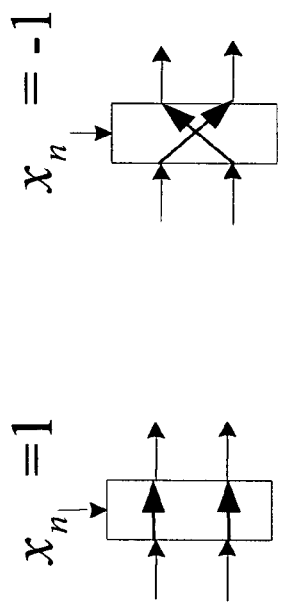
FIG. 6 depicts the VLSI architecture of the 2-layer STM engine of the present invention.
Figure 6A:
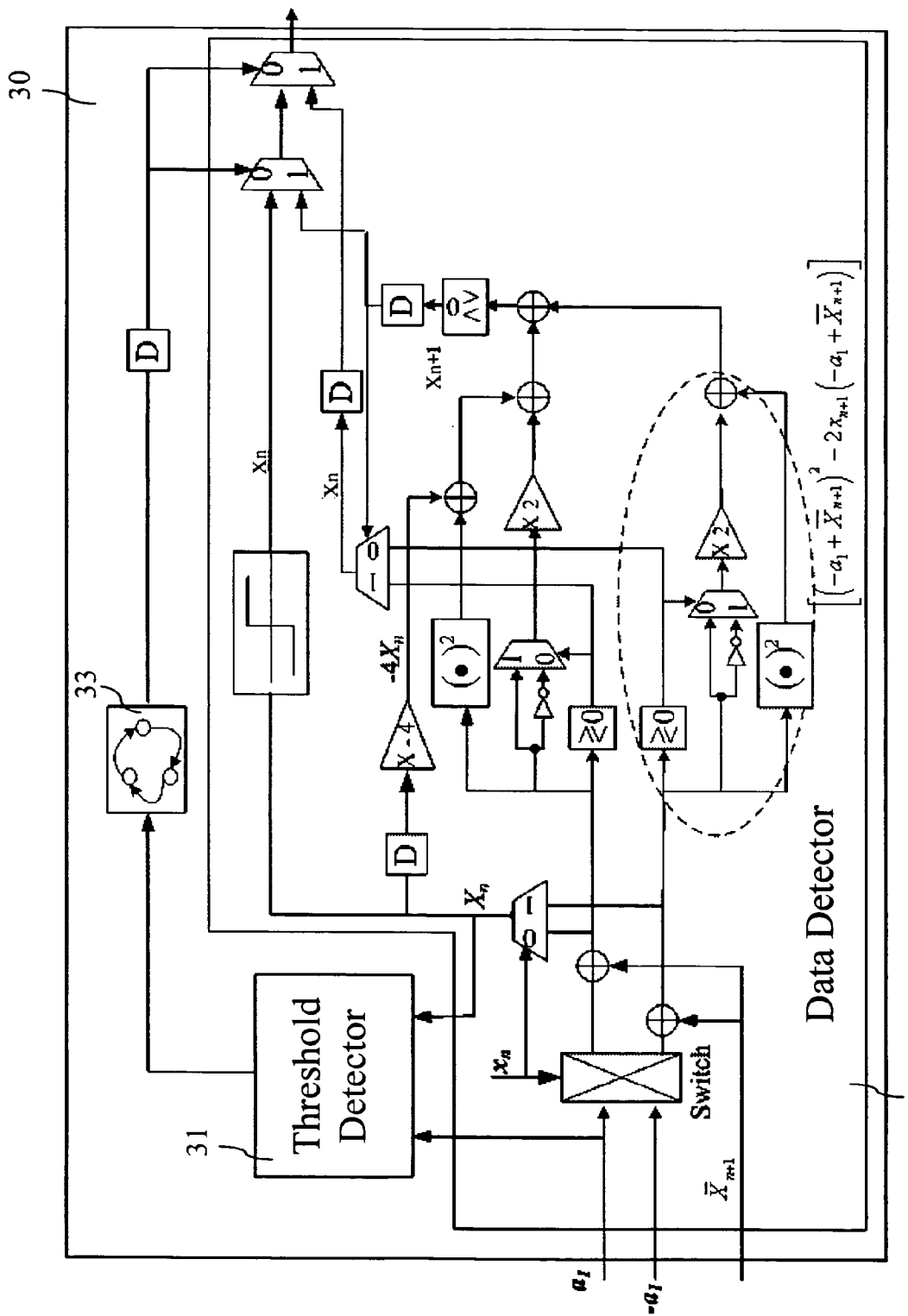

3. Data detector 32: The data detector 32 performs Eq. (3) and outputs the output of the equalizer. The VLSI architecture of the data detector 32 is as shown in FIG. 6A. The switch operation of the data detector 32 is shown in FIG. 6B.

To appreciate the effect of the STM-DFE, the present invention compares it with the conventional DFE, TT-DFE for BER (Bit Error Rate) and BEL (Burst Error Length) by simulations. The simulations employs the channel model proposed by B. E. Moision, P. Seigel and E. Soljanin, published in an academic essay of ISIT Cambridge, Mass., USA, 16-21 August, 1998, entitled "Error Event Characterization and Coding for the Equalized Lorentzian Channel". The channel model is a Lorentzian channel at user density $\beta=2.5$. The simulation setups of FIG. 7 and FIG. 8 are the same.

Figure 7:
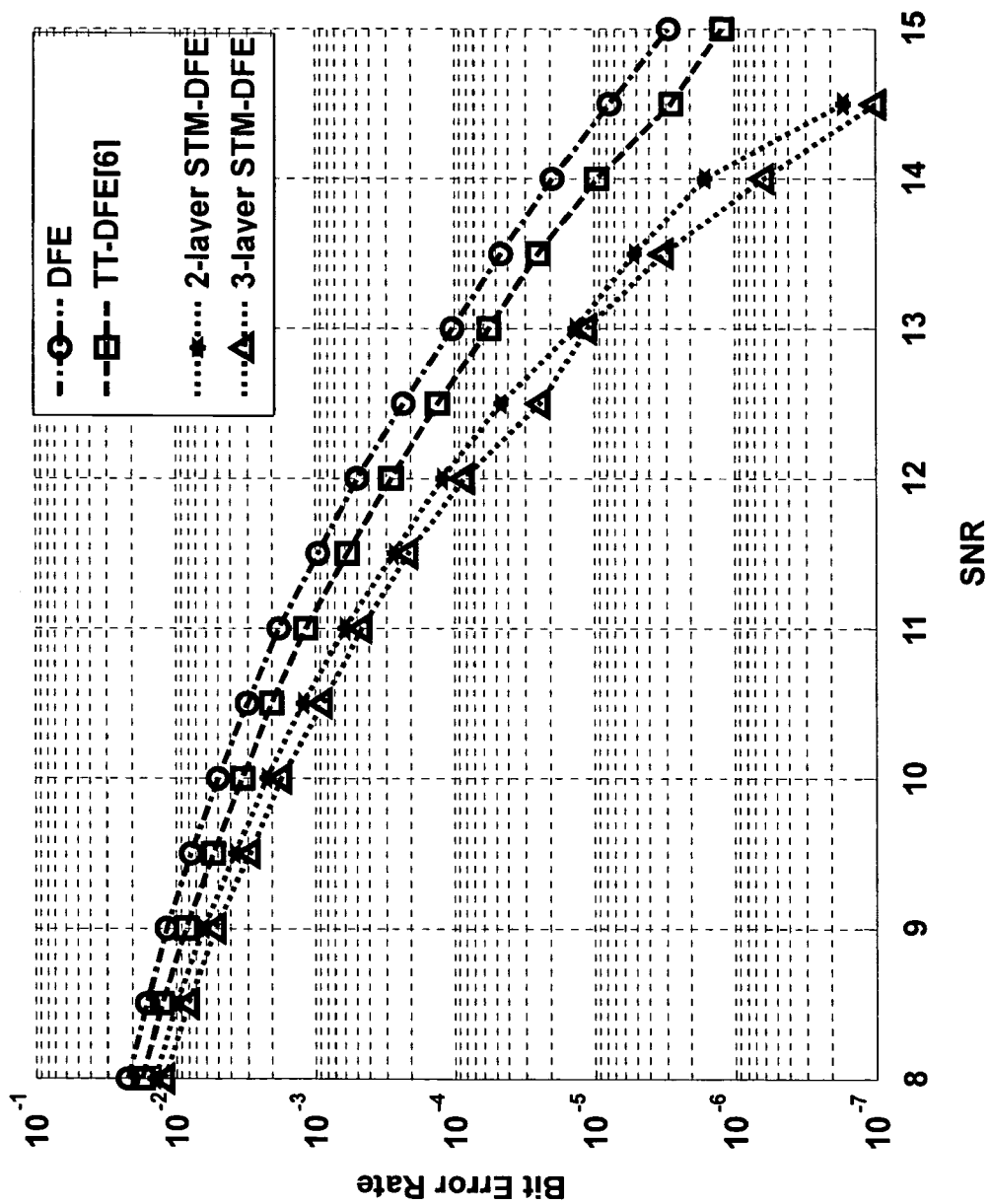
FIG. 7 depicts the BER comparison of the present STM-DFE and the conventional DFE and TT-DFE.

Please refer to FIG. 7, which shows comparison of Bit Error Rate between the present STM-DFE and the conventional DFE and TT-DFE. It is apparent that the present STM-DFE has better performance than the DFE and TT-DFE. The 3-layer STM-DFE can perform better than the 2-layer STM-DFE.

Figure 8:
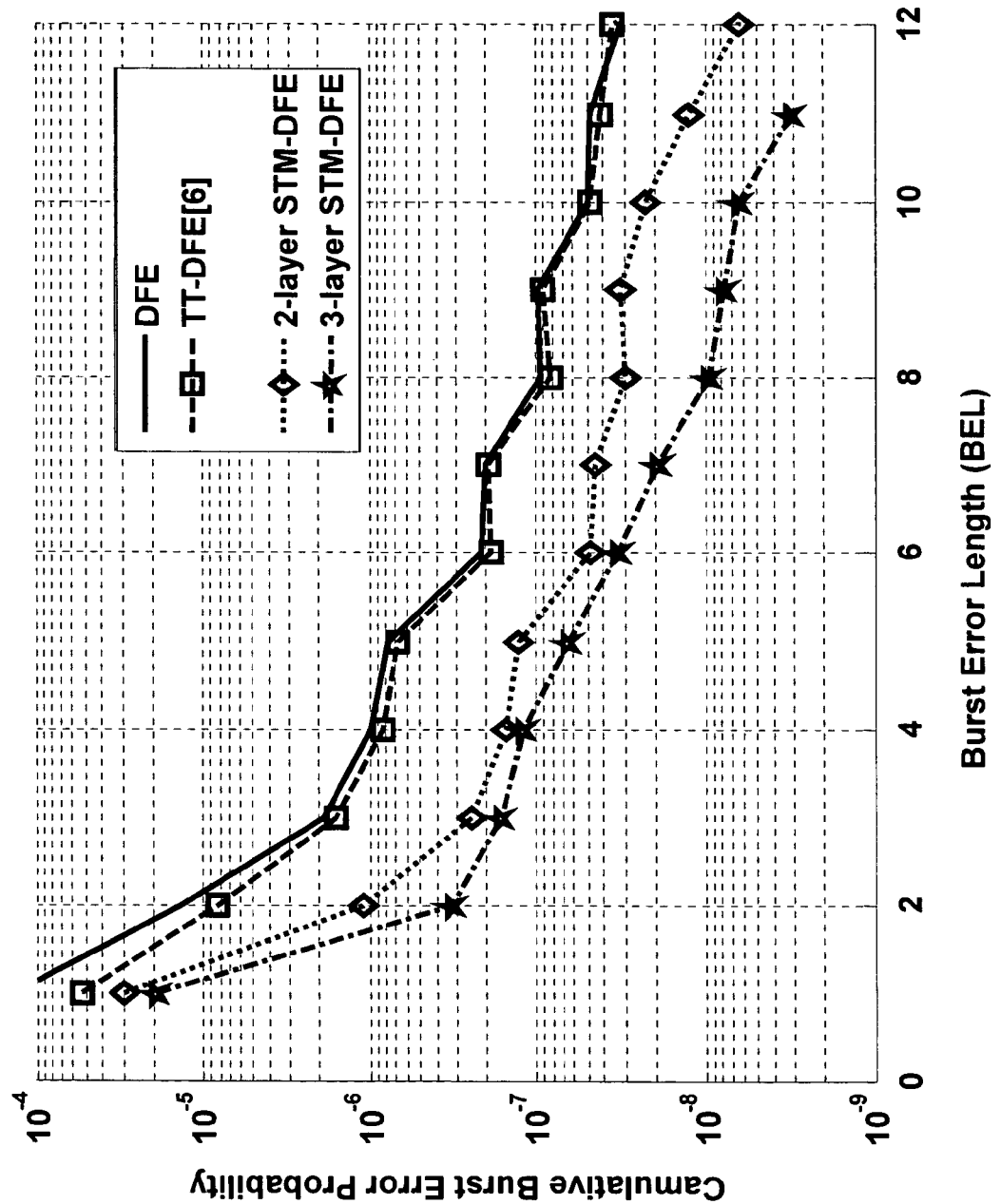
FIG. 8 depicts the BEL comparison of the present STM-DFE and the conventional DFE and TT-DFE.

Please refer to FIG. 8, which shows comparison of Burst Error Length (BEL) between the present STM-DFE and the conventional DFE and TT-DFE. It is apparent that the present STM-DFE always achieves lower error probability than the conventional DFE and TT-DFE in every burst error length. In other words, the present STM method performs better in reducing the error propagation. In addition, the 3-layer STM-DFE has better performance than the 2-layer STM-DFE for both BER and BEL.

Although the present invention has been described in detail with reference to certain embodiments thereof, those skilled in the art can easily understand that all kinds of alterations and changes can be made within the spirit and scope of the appended claims. Therefore, the spirit and scope of the appended claims should not be limited to the description of the embodiments contained herein.

What is claimed is:

1. A soft-threshold-based multi-layer decision feedback equalizer, comprising a feed forward filter, a feed backward filter, an adder and a decision device coupled to said adder, said adder coupled to an output end of said feed forward filter and an output end of said feed backward filter; in response to a signal received by said decision feedback equalizer, said adder generating an output to said decision device by adding output of said feed forward filter and output of said feed backward filter, said decision device detecting whether or not said output generated by said adder is in a defined threshold value and determining the operation of said decision device is a slicer or delay decision, so as to enable said decision feedback equalizer to perform soft-threshold-based multi-layer decision.

2. The equalizer as claimed in claim 1, wherein said decision device determines said output is in a reliable region or in an unreliable region based on said threshold value.

3. The equalizer as claimed in claim 2, wherein when said decision device detects said output is in said reliable region, said decision device works as said slicer.

4. The equalizer as claimed in claim 2, wherein when said decision device detects said output is in said unreliable region, said decision device works as delay decision until said decision devices detects said output is in said reliable region.

5. A soft-threshold-based multi-layer decision feedback equalizer, comprising a feed forward filter for receiving a transmitted data, a feed backward filter, an adder and a soft-threshold-based multi-layer decision engine, said adder coupled to an output end of said feed forward filter and an output end of said feed backward filter and generating an output of said equalizer, wherein said soft-threshold-based multi-layer decision engine includes:
a threshold detector for detecting said output of said equalizer to generate an output;
a data detector for detecting said output of said equalizer to generate a feedback output;
and a state machine for controlling said data detector to generate or delay said feedback output in accordance with said output generated by said threshold detector.

6. The equalizer as claimed in claim 5, wherein said threshold detector detects said output of said equalizer based on a defined threshold value, and said output generated by said threshold detector indicates said output of said equalizer is in a reliable region or in an unreliable region.

7. The equalizer as claimed in claim 6, wherein said state machine includes a slicing state and a delay decision state.

8. The equalizer as claimed in claim 7, wherein said soft-threshold-based multi-layer decision engine works as a slicer in said slicing state.

9. The equalizer as claimed in claim 7, wherein said soft-threshold-based multi-layer decision engine delays said feedback output in said delay decision state.

10. The equalizer as claimed in claim 7, wherein when said output generated by said threshold detector indicates said output of said equalizer is in said reliable region, said data detector outputs data and said state machine switches to said slicing state such that said soft-threshold-based multi-layer decision engine works as said slicer.

11. The equalizer as claimed in claim 7, wherein when said output generated by said threshold detector indicates said output of said equalizer is in said unreliable region, said state machine is in said delay decision state such that said data detector delays said feedback output until said output indicates said output of said equalizer is in said reliable region and said state machine returns to said slicing state.

12. A soft-threshold-based multi-layer decision method performed by a decision feedback equalizer comprising a feed forward filter, a feed backward filter, an adder coupled to an output end of said feed forward filter and an output end of said feed backward filter and a decision device coupled to said adder, said method comprising:
receiving a signal by said decision feedback equalizer;
in response to reception of said signal by said decision feedback equalizer, generating an output by adding output of said feed forward filter and output of said feed backward filter; and
detecting an output of said decision feedback equalizer based on a threshold value to determine the operation of said decision device is a slicer or delay decision.

13. The method as claimed in claim 12, further comprising the step of using a threshold detector to detect said output of said decision feedback equalizer is in a reliable region or in an unreliable region based on a threshold value.

14. The method as claimed in claim 13, further comprising the step of when said output of said decision feedback equalizer is in said reliable region, said decision device works as said slicer.

15. The method as claimed in claim 13, further comprising the step of when said output of said decision feedback equalizer is in said unreliable region, said decision device works as delay decision and keeps said output of said decision feedback equalizer, said output of said decision feedback equalizer and an output of said decision feedback equalizer at next time are inputted in said threshold detector until an output of said decision feedback equalizer is in said reliable region, said decision feedback data is output and said decision device works as said slicer.

* * * * *